(12) United States Patent
Tsao et al.

(10) Patent No.: US 9,507,387 B2
(45) Date of Patent: Nov. 29, 2016

(54) PIVOT MECHANISM OF FOLDABLE ELECTRONIC DEVICE

(71) Applicants: HONG FU JIN PRECISION INDUSTRY (ShenZhen) CO., LTD., Shenzhen (CN); HON HAI PRECISION INDUSTRY CO., LTD., New Taipei (TW)

(72) Inventors: Tai-An Tsao, New Taipei (TW); Ting-Yu Wang, New Taipei (TW); Lei Han, Shenzhen (CN); Hsieh-Chih Chiang, New Taipei (TW); Hung-Ming Chen, New Taipei (TW)

(73) Assignees: HONG FU JIN PRECISION INDUSTRY (ShenZhen) CO., LTD., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 158 days.

(21) Appl. No.: 14/304,194

(22) Filed: Jun. 13, 2014

(65) Prior Publication Data

US 2014/0368996 A1 Dec. 18, 2014

(30) Foreign Application Priority Data

Jun. 17, 2013 (CN) .......................... 2013 1 02369779

(51) Int. Cl.
 *E05C 17/64* (2006.01)
 *G06F 1/16* (2006.01)

(52) U.S. Cl.
 CPC ........... *G06F 1/1681* (2013.01); *G06F 1/1616* (2013.01); *E05Y 2900/606* (2013.01); *Y10T 16/547* (2015.01); *Y10T 16/5478* (2015.01)

(58) Field of Classification Search
 CPC . G06F 1/1681; G06F 1/1616; Y10T 16/547; Y10T 16/5478; Y10T 16/5387; E05Y 2900/606; E05D 3/12
 See application file for complete search history.

(56) References Cited

U.S. PATENT DOCUMENTS

| | | | | |
|---|---|---|---|---|
| 8,627,546 B2* | 1/2014 | Zhang | ................... | G06F 1/1681 16/366 |
| 9,057,215 B1* | 6/2015 | Horng | ....................... | E05D 3/12 |
| 9,134,767 B2* | 9/2015 | Chen | ..................... | G06F 1/1681 |
| 9,185,815 B2* | 11/2015 | Hsu | ....................... | H05K 5/0226 |
| 2009/0310298 A1* | 12/2009 | Chou | ................... | G06F 1/1616 361/679.55 |
| 2011/0265288 A1* | 11/2011 | Chiang | ................. | G06F 1/1681 16/341 |
| 2012/0192381 A1* | 8/2012 | Zhang | ................... | G06F 1/1681 16/366 |
| 2013/0170108 A1* | 7/2013 | Lin | ....................... | G06F 1/1618 361/679.01 |
| 2014/0298935 A1* | 10/2014 | Yeh | ....................... | G06F 1/1681 74/98 |
| 2015/0184439 A1* | 7/2015 | Hsu | ....................... | G06F 1/1681 16/350 |
| 2015/0227175 A1* | 8/2015 | Motosugi | .............. | G06F 1/1681 16/341 |

* cited by examiner

*Primary Examiner* — Victor Batson
*Assistant Examiner* — Matthew Sullivan
(74) *Attorney, Agent, or Firm* — Zhigang Ma

(57) ABSTRACT

A pivot mechanism rotatably coupes a cover to a base of a foldable electronic device. The pivot mechanism includes a connector, a first rotation assembly, and a second rotation assembly. The first rotation assembly is rotatably coupled to the base and fixedly attached to the connector. The second rotation assembly is fixedly coupled to the cover and rotatably coupled to the connector. The first rotation assembly rotates relative to the base and the second rotation assembly remains fixed relative to the connector as the cover is rotated open to a first angle. The second rotation assembly rotates relative to the connector as the cover is rotated further to a second angle.

16 Claims, 13 Drawing Sheets

PIVOT MECHANISM OF FOLDABLE ELECTRONIC DEVICE

CROSS-REFERENCE TO RELTATED APPLICATIONS

This application claims priority to Chinese Patent Application No. 201310236977.9 filed on Jun. 17, 2013 in the China Intellectual Property Office, the contents of which are incorporated by reference herein.

FIELD

Embodiments of the present disclosure generally relate to foldable electronic devices, and more particularly, to a pivot mechanism utilized in a foldable electronic device.

BACKGROUND

Foldable electronic devices, such as notebook computers, generally include a base, a cover, and a pivot mechanism. The pivot mechanism rotatably connects the cover to the base. The pivot mechanism of many notebook computers include a shaft and two fixing portions to connect the cover to the base.

BRIEF DESCRIPTION OF THE DRAWINGS

Implementations of the present technology will now be described, by way of example only, with reference to the attached figures, wherein.

DETAILED DESCRIPTION

Figure 1:
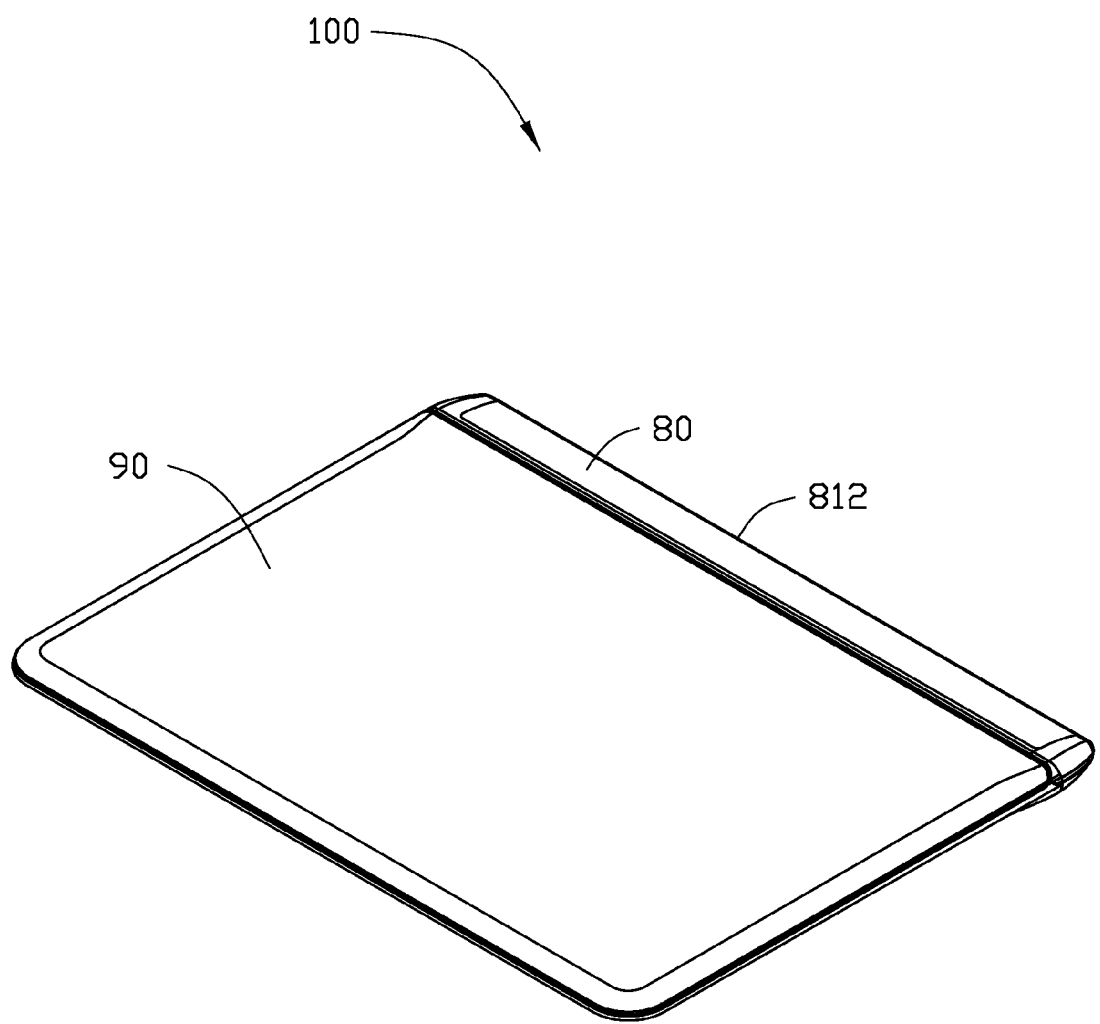
FIG. 1 is an isometric view of a foldable electronic device in a folded state.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein The term "coupled" is defined as connected, whether directly or indirectly through intervening components, and is not necessarily limited to physical connections. The connection can be such that the objects are permanently connected or releasably connected. The term "substantially" is defined to be essentially conforming to the particular dimension, shape or other word that substantially modifies, such that the component need not be exact. For example, substantially cylindrical means that the object resembles a cylinder, but can have one or more deviations from a true cylinder. The term "comprising" means "including, but not necessarily limited to"; it specifically indicates open-ended inclusion or membership in a so-described combination, group, series and the like.

The present disclosure is described in relation to a pivot mechanism employed by a foldable electronic device.

FIG. 1 illustrates a foldable electronic device 100 in a folded state. The foldable electronic device 100 includes a base 80, a cover 90, and a pivot mechanism 1 pivotably connected between the base 80 and the cover 90. The cover 90 can rotate relative to the base 80 via the pivot mechanism 1. In this embodiment, the foldable electronic device 100 can be a portable computer such as a notebook.

Figure 2:
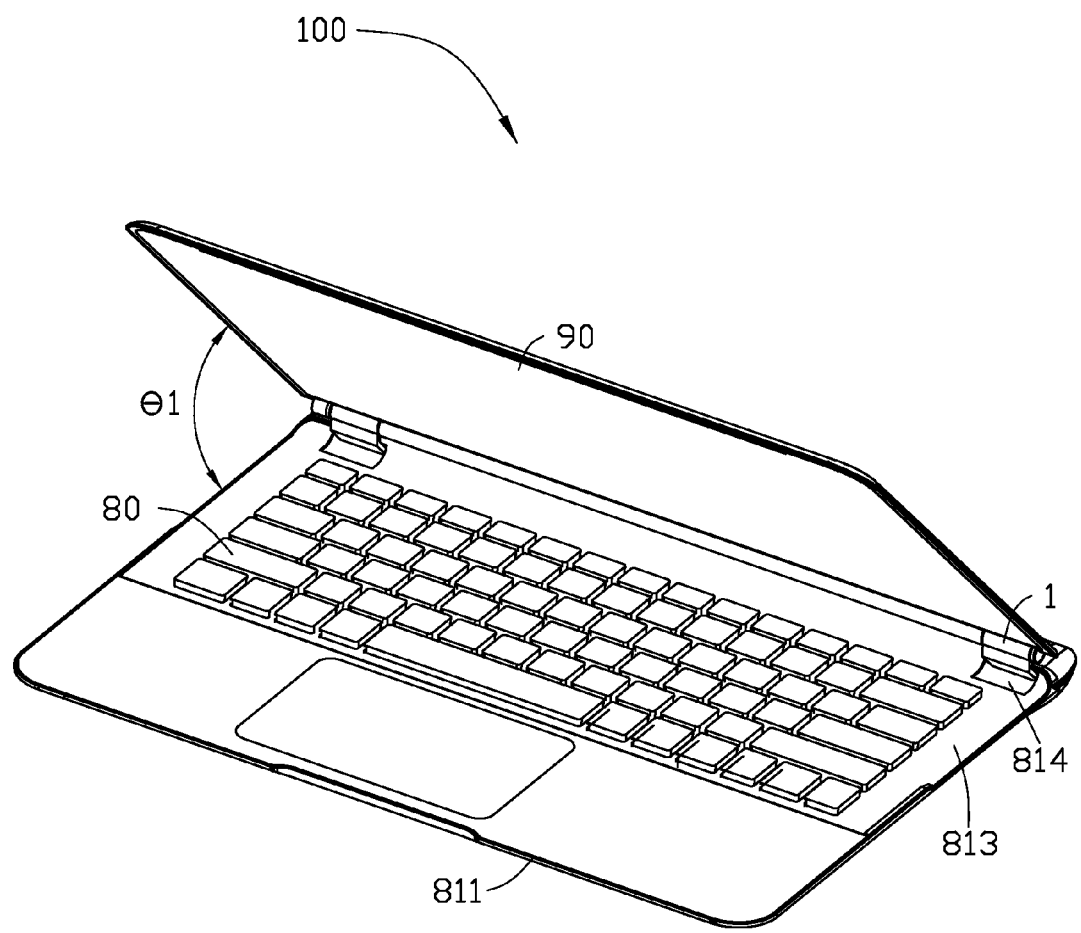
FIG. 2 is an isometric view of the foldable electronic device of FIG. 1, wherein a cover is rotated to a first angle relative to a base.
Figure 3:
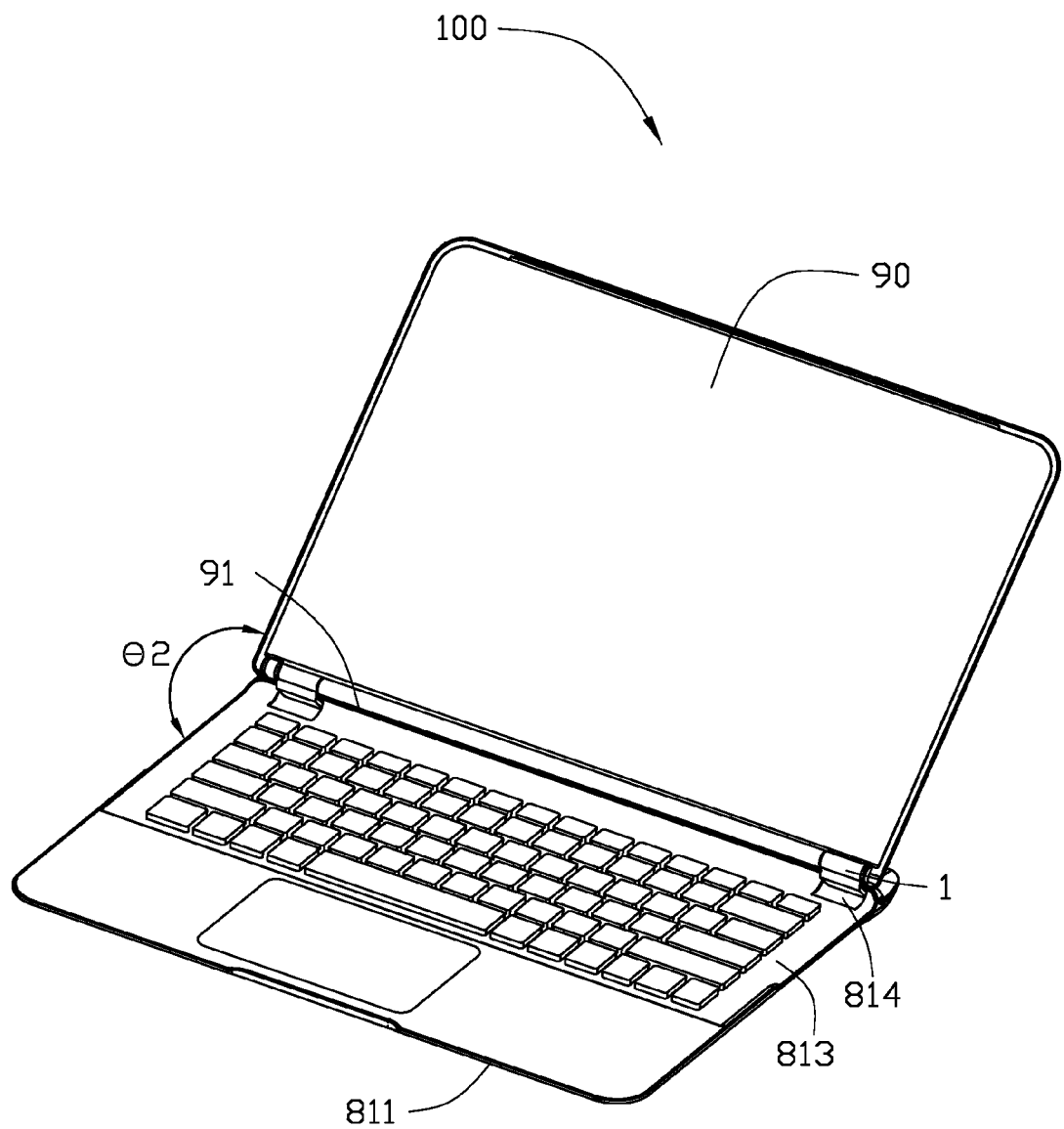
FIG. 3 is similar to FIG. 2, but the cover is rotated further to a second angle relative to the base from the first angle.

FIG. 2 illustrates the foldable electronic device 100 in an expanded state when the cover 90 is rotated to a first angle (e.g., θ1) relative to the base 80. FIG. 3 shows the cover 90 is rotated further to a second angle (e.g., θ2) relative to the base 80 from the first angle. The base 80 includes a main body 81, and at least one input/output (I/O) interface 82 located on the main body 81. The main body 81 includes a front side 811, a rear side 812 opposite to the front side 811, and an upper surface 813 connected between the front side 811 and the rear side 812. In the illustrated embodiment, the at least one I/O interface 82 is located on the rear side 812. The upper surface 813 defines two recessed first installation portions 814 adjacent to the rear side 812. The cover 90 includes a bottom side 91. Two second installation portions 911 protrude from the bottom side 91 and correspond to the two first installation portions 814.

Figure 4:
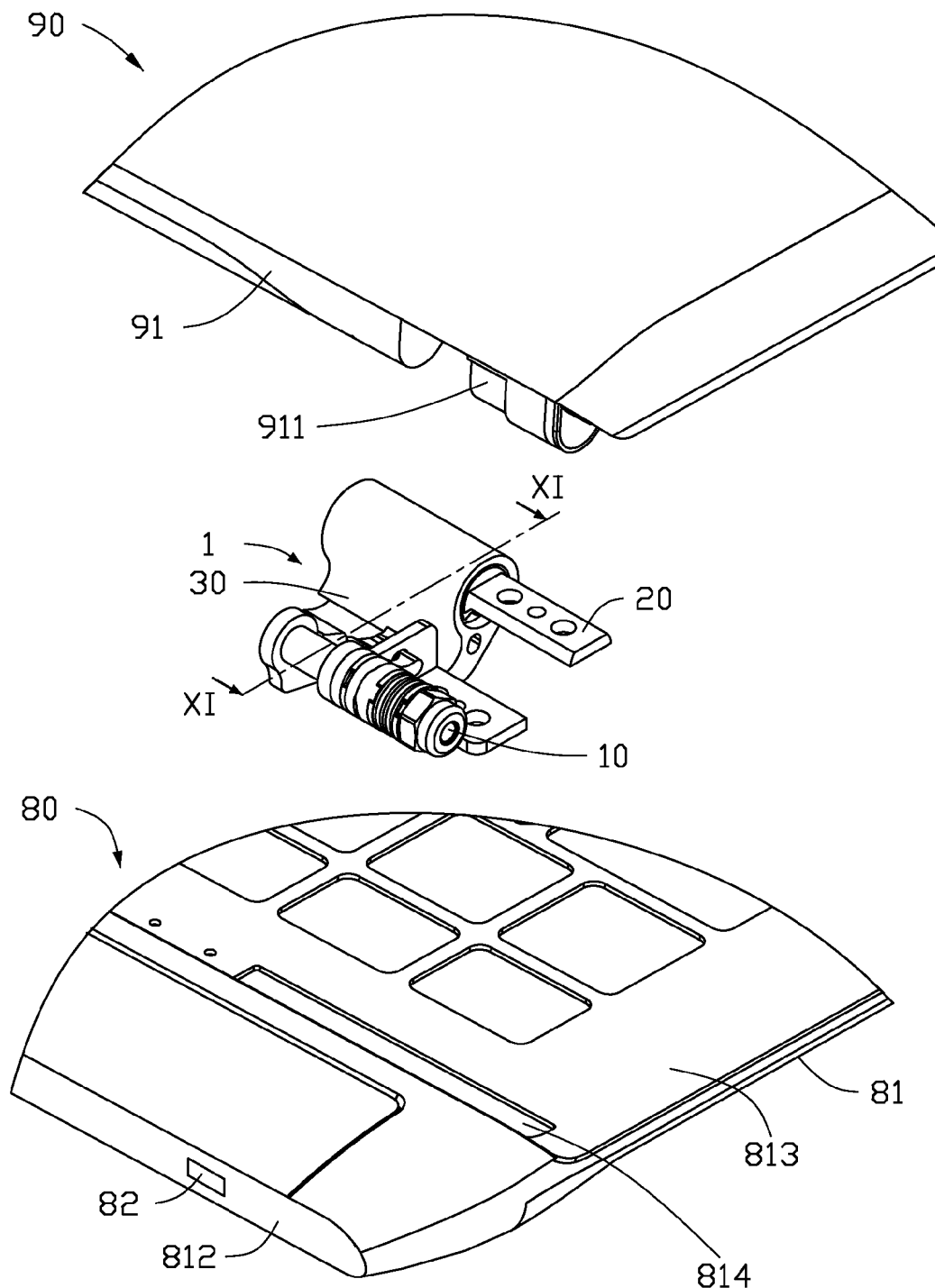
FIG. 4 is a partial isometric exploded view of the foldable electronic device of FIG. 1.

Referring to FIG. 4, the pivot mechanism 1 includes a first rotation assembly 10, a second rotation assembly 20, and a connector 30 connected between the first rotation assembly 10 and the second rotation assembly 20. The first rotation assembly 10 is rotatably connected to the base 80 and fixed to one end of the connector 30. The second rotation assembly 20 is rotatably connected to another end of the connector 30 and fixed to the cover 90. When the base 80 is covered by the cover 90, the cover 90 can be rotated relative to the base 80 by an external force. To rotate the cover 90 to a first angle relative to the base 80, the first rotation assembly 10 rotates relative to the base while the second rotation assembly 20 does not rotate relative to the connector. To rotate the cover 90 to a second angle relative to the base 80 from the first angle, the second rotation assembly 20 rotates relative to the connector while the first rotation assembly 10 does not rotate. In the illustrated embodiment, the second angle is larger than the first angle.

Figure 5:
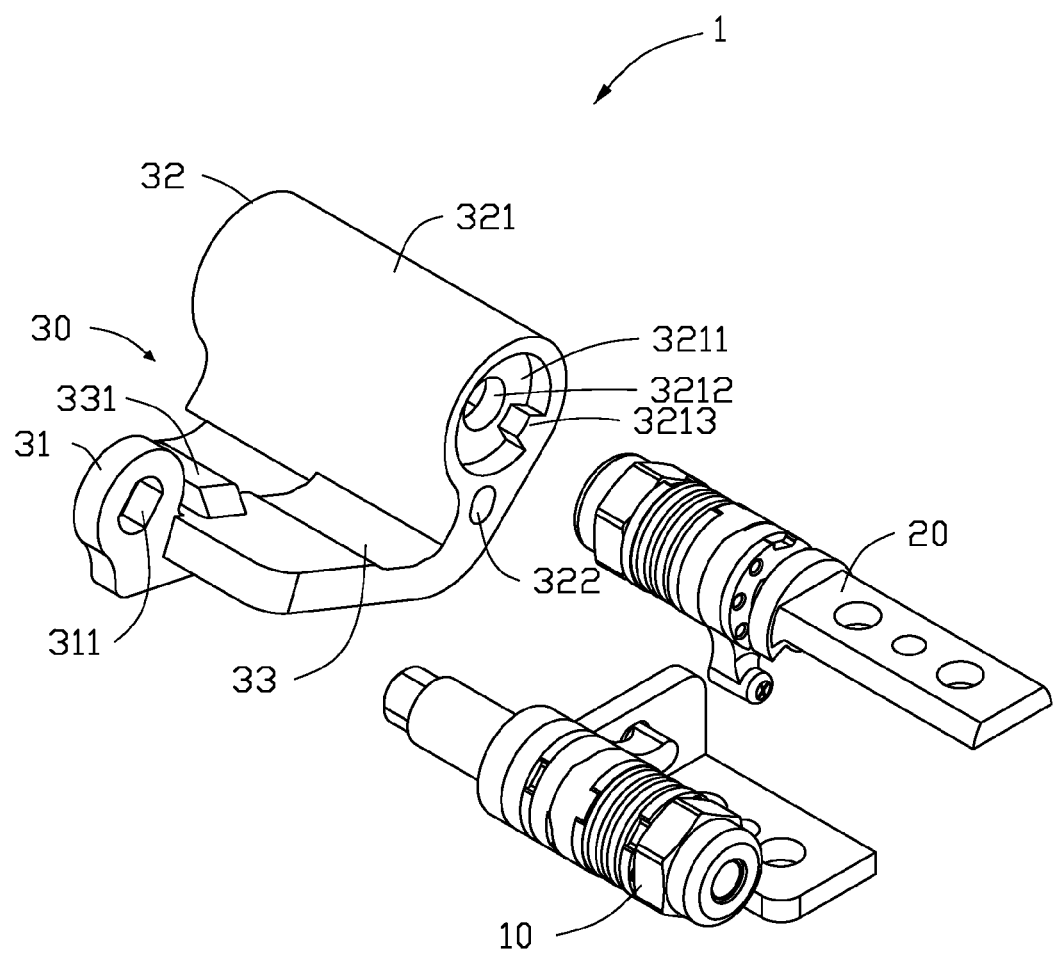
FIG. 5 is an exploded isometric view of a pivot mechanism of FIG. 4.
Figure 6:
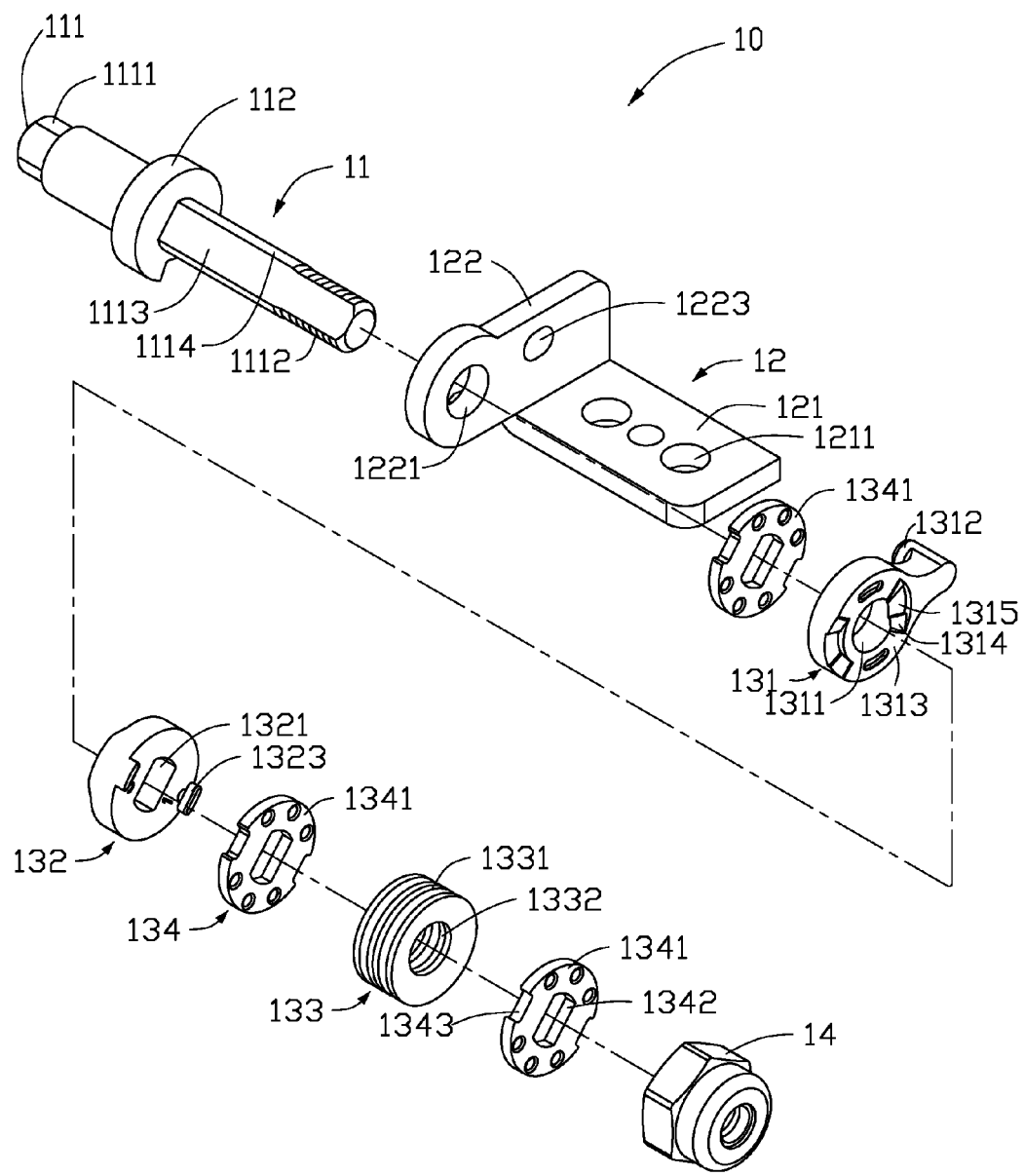
FIG. 6 is an exploded isometric view of a first rotation assembly of FIG. 5.
Figure 7:
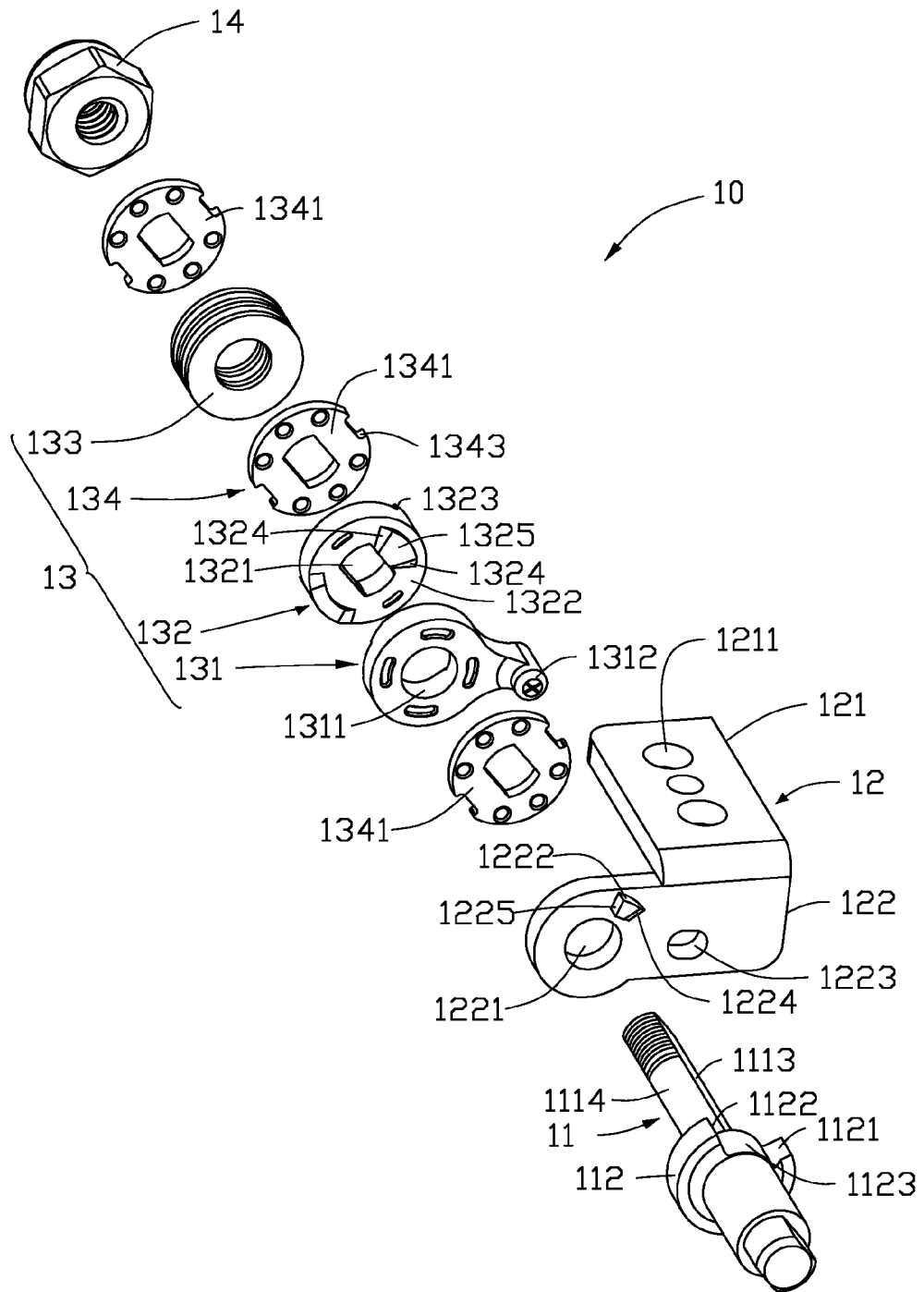
FIG. 7 is similar to FIG.6, but viewed from another angle.

Referring to FIGS. 5-7, the first rotation assembly 10 includes a first rotation shaft 11, a positioning member 12, a first torsion assembly 13, and a first stopping member 14. The positioning member 12 and the first torsion assembly 13 are both sleeved on the first rotation shaft 11. In the illustrated embodiment, the first stopping member 14 is a nut screwed onto an end portion of the first rotation shaft 11 to prevent the positioning member 12 and the first torsion assembly 13 from detaching from the first rotation shaft 11.

The first rotation shaft 11 includes a first post 111, and a first sector wheel 112 protruding from an outer surface of the first post 111. In the illustrated embodiment, the first sector wheel is a substantially circular wheel with a sector section removed. The first post 111 includes a first end portion 1111, and a second end portion 1112 opposite to the first end portion 1111. A portion of the first post 111 forms two substantially parallel first planes 1113 and two opposite first cambered surfaces 1114 on the outer surface thereof. The first sector wheel 112 is located adjacent to the first end portion 1111. The first sector wheel 112 includes a first stopping surface 1121, a second stopping surface 1122, and a first gap 1123 defined between the first stopping surface 1121 and the second stopping surface 1122.

The positioning member 12 includes a first positioning portion 121, and a holding portion 122 substantially perpendicularly connected to the first positioning portion 121. The first positioning portion 121 and defines a plurality of first assembly holes 1211 to allow the positioning member 12 to be attached to the first installation portion 814 of the base 80. The holding portion 122 defines a first through hole 1221 and a first positioning hole 1223, and includes a first limiting block 1222 protruding from a surface thereof. The first through hole 1221 is defined in an end portion of the holding portion 122 not connected to the first positioning portion 121. The first through hole 1221 corresponds to the second end portion 1112 of the first post 111. The first limiting block 1222 is located adjacent to the first through hole 1221. The first limiting block 1222 forms a first limiting surface 1224 and a second limiting surface 1225 corresponding to the first stopping surface 1121 and the second stopping surface 1122 of the first sector wheel 112, respectively. The first limiting surface 1224 is slanted relative to the holding portion 122, and the second limiting surface 1225 is substantially perpendicular to the holding portion 122. The first positioning hole 1223 is defined adjacent to a center of the holding portion 122. When the positioning member 12 is sleeved on the second end portion 1112 of the first post 111, a surface of the holding portion 122 where the first limiting block 122 is located resists the first sector wheel 112, and the first limiting block 1222 is received in the first gap 1123. When the first rotation shaft 11 is rotated relative to the positioning member 12, the first stopping surface 1121 and the second stopping surface 1122 of the first sector wheel 112 limit the first rotation shaft 11 to rotate within the first angle. In at least one embodiment, the first angle can be 45 degrees.

The first torsion assembly 13 includes a first cam 131, a second cam 132, a first elastic assembly 133, and a first pad assembly 134. The second cam 132 can be driven by the first rotation shaft 11 to rotate relative to the first cam 131.

The first cam 131 defines a second through hole 1311, and includes a first positioning pole 1312 and a first recessed surface 1313. The second through hole 1311 is defined in a substantially central portion of the first cam 131. A width of the second through hole 1311 is substantially equal to a width of the first through hole 1221 of the holding portion 122. The first positioning pole 1312 protrudes from a first side of the first cam 131 to be received in the first positioning hole 1223, to fix the first cam 131 to the positioning member 12. The first recessed surface 1313 is formed on a second side of the first cam 131 opposite to the first side. The first recessed surface 1313 defines two first stepped notches 1315. Each first stepped notch 1315 includes an inner stepped portion and an outer stepped portion. The outer stepped portion slopes toward the inner stepped portion to form one or more first inclined walls 1314.

The second cam 132 defines a first slot 1321. The second cam 132 forms a first protrusion surface 1322 corresponding to the first recessed surface 1313 of the first cam 131. Two first stopping blocks 1323 protrude from a side of the second cam 132 away from the first cam 131. The second cam 132 can be sleeved on the second end portion 1112 of the first post 111 via the first slot 1321 to rotate together with the first rotation shaft 11. Two first protrusions 1325 corresponding to the two first stepped notches 1315 of the first cam 131 protrude from the first protrusion surface 1322. Each first protrusion 1325 forms second inclined walls 1324 corresponding to the first inclined walls 1314.

The first elastic assembly 133 includes a plurality of first elastic sheets 1331. The first elastic sheets 1331 are substantially circular. A third through hole 1332 is defined through each of the first elastic sheets 1331. A width of the third through hole 1332 is substantially equal to the width of the first through hole 1221 of the positioning member 12.

The first pad assembly 134 includes a plurality of first pads 1341. Each first pad 1341 defines a second slot 1342 and two first stopping notches 1343. The second slot 1342 is located in a substantially central portion of the first pad 1341 and has a shape substantially equal to a shape of the first slot 1321. The first pads 1341 can be sleeved on the second end portion 1112 of the first post 111 via the second slot 1342 and rotate with the first rotation shaft 11. The two first stopping notches 1343 are defined in two respective opposite edges of the first pads 1341. In this embodiment, two first pads 1341 are positioned at two respective opposite sides of the first torsion assembly 13, and one first pad 1341 is positioned between the second cam 132 and the first elastic assembly 133. The two first stopping notches 1343 of the first pad 1341 positioned between the second cam 132 and the first elastic assembly 133 are configured to be secured with the two respective first stopping blocks 1323 of the second cam 132.

Figure 8:
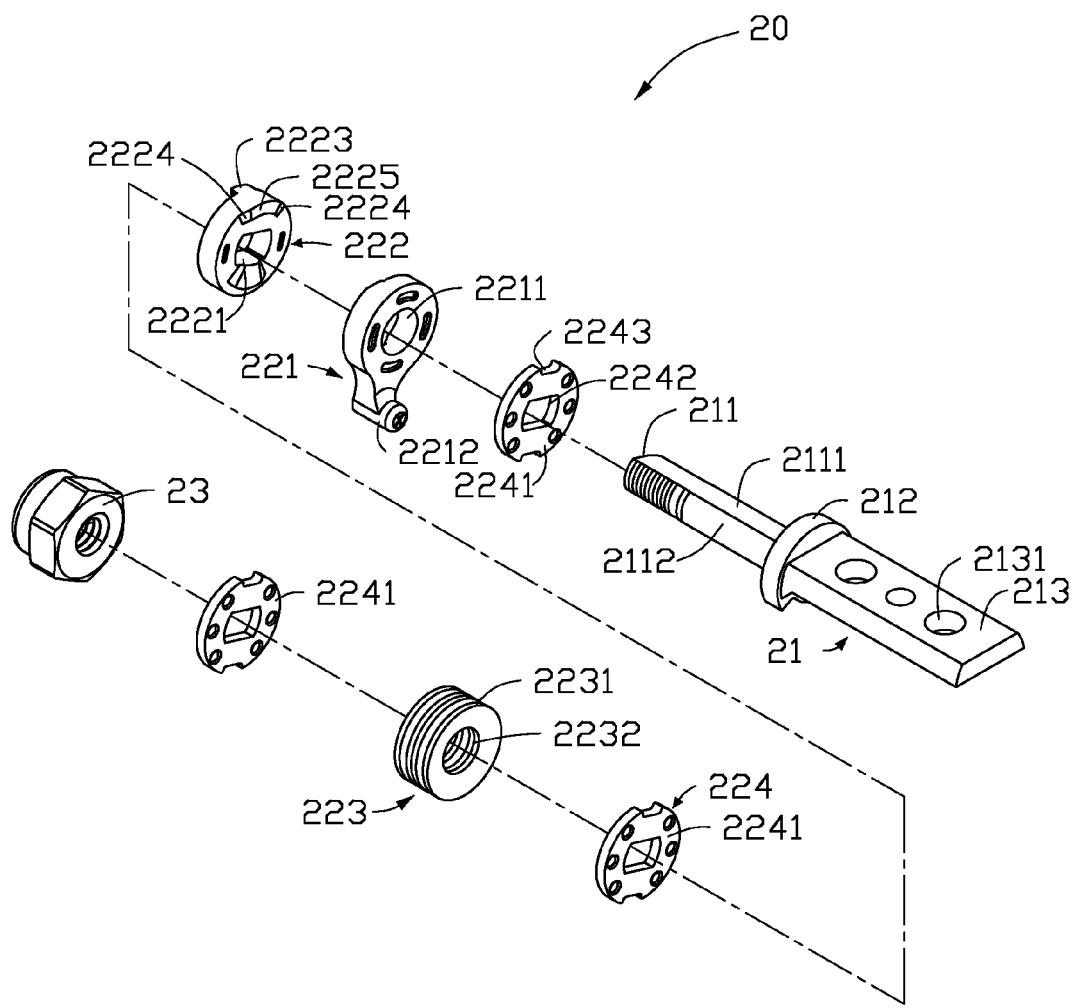
FIG. 8 is an exploded view of a second rotation assembly of FIG. 5.
Figure 9:
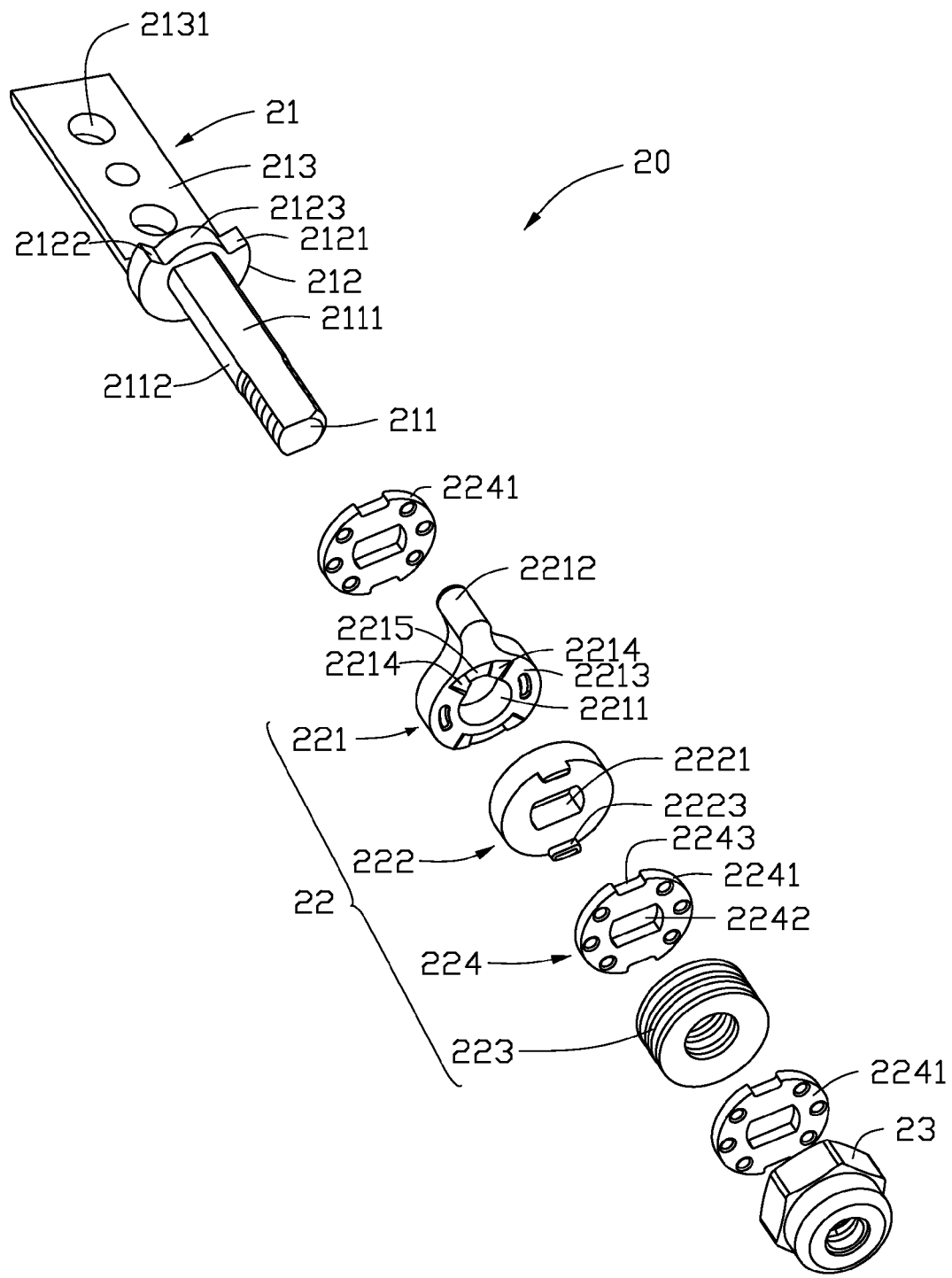
FIG. 9 is similar to FIG.8, but viewed from another aspect.

Referring to FIGS. 8 and 9, the second rotation assembly 20 includes a second rotation shaft 21, a second torsion assembly 22 sleeved on the second rotation shaft 21, and a second stopping member 23 that prevents the second torsion assembly 22 from detaching from the second rotation shaft 21.

The second rotation shaft 21 includes a second post 211, a second sector wheel 212 protruding from an outer surface of the second post 211, and a second positioning portion 213 located on a side of the second sector wheel 212 away from the second post 211. In the illustrated embodiment, the second sector wheel is a substantially circular wheel with a sector section removed. A portion of the second post 211 forms two substantially parallel second planes 2111 and two opposite second cambered surfaces 2112 on the outer surface thereof. The second sector wheel 212 includes a third stopping surface 2121, a fourth stopping surface 2122, and a second gap 2123 defined between the third stopping surface 2121 and the fourth stopping surface 2122. The second positioning portion 213 is fixed to the second sector wheel 212. The second positioning portion 213 and the second post 211 are located at two opposite sides of the second sector wheel 212. The second positioning portion 213 defines a plurality of second assembly holes 2131 to allow the second positioning portion 213 to be attached to the second installation portion 911 of the cover 90.

The second torsion assembly 22 has substantially the same structure as the first torsion assembly 13. In this embodiment, the second torsion assembly 22 includes a third cam 221, a fourth cam 222, a second elastic assembly 223, and a second pad assembly 224. The fourth cam 222 can be driven by the second rotation shaft 21 to rotate relative to the third cam 221.

The third cam 221 has substantially the same structure as the first cam 131. The third cam 221 defines a fourth through hole 2211, and includes a second positioning pole 2212 and a second recessed surface 2213. The third cam 221 can be sleeved on the second post 211 via the fourth through hole 2211. The second recessed surface 2213 defines two second stepped notches 2215. Each second stepped notch 2215 includes an inner stepped portion and an outer stepped portion. The outer stepped portion slopes toward the inner stepped portion to form a third inclined wall 2214.

The fourth cam 222 has substantially the same structure as the second cam 132. The fourth cam 222 defines a third slot 2221, and includes two second stopping blocks 2223. The fourth cam 222 forms a second protrusion surface. The fourth cam 222 can be sleeved on the second post 211 via the third slot 2221, to rotate together with the second rotation shaft 21. The second protrusion surface corresponds to the second recessed surface 2213 of the third cam 221. Two opposite second protrusions 2225 corresponding to the two second stepped notches 2215 protrude from the second protrusion surface. Each second protrusion 2225 forms one or more fourth inclined wall 2224.

The second elastic assembly 223 has substantially the same structure as the first elastic assembly 133. The second elastic assembly 223 includes a plurality of second elastic sheets 2231. Each second elastic sheet 2231 defines a fifth through hole 2232 having substantially the same width as the fourth through hole 2211 of the third cam 221.

The second pad assembly 224 has substantially the same structure as the first pad assembly 134. The second pad assembly 224 includes a plurality of second pads 2241. Each second pad 2241 defines a fourth slot 2242 and two second stopping notches 2243. Each second pad 2241 can be sleeved onto the second post 211 of the second rotation shaft 21, to rotate with the second rotation shaft 21. In this embodiment, there are two second pads 2241 positioned at two respective opposite sides of the second torsion assembly 22, and one second pad 2241 positioned between the fourth cam 222 and the second elastic assembly 223. The two second stopping notches 2243 of the second pad 2241 positioned between the fourth cam 222 and the second elastic assembly 223 are configured to be secured with the two respective second stopping blocks 2223 of the fourth cam 222.

Figure 10:
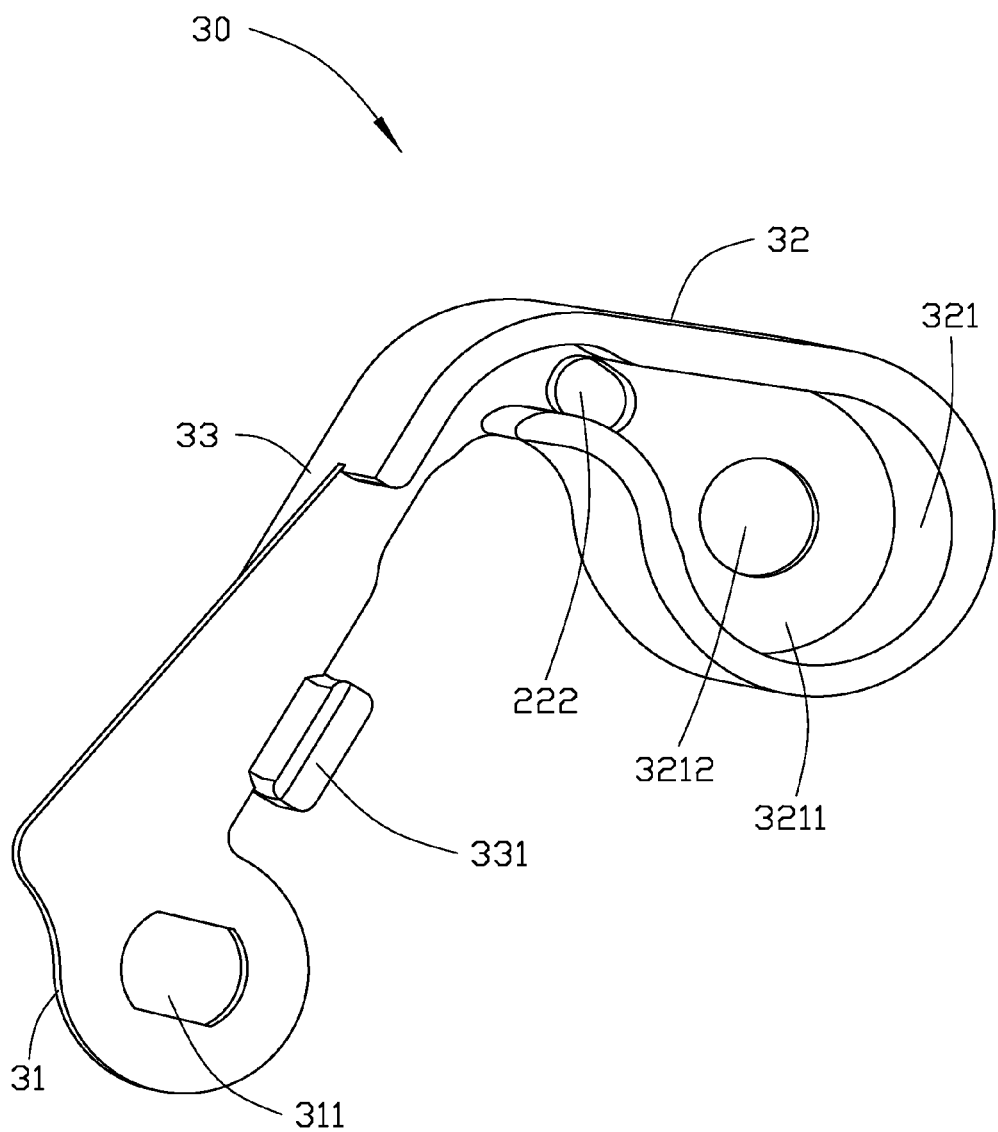
FIG. 10 shows an isometric view of a connector of FIG. 5.

Referring to FIGS. 5 and 10, the connector 30 includes a third installation portion 31, a fourth installation portion 32, and a connection portion 33. The connection portion 33 is connected between the third installation portion 31 and the fourth installation portion 32. The third installation portion 31 defines a fifth slot 311. The third installation portion 31 can be sleeved onto the first end portion 1111 of the first rotation shaft 11 via the fifth slot 311. Thus, the first rotation shaft 11 can be driven by the third installation portion 31 to rotate relative to the positioning member 12 and the base 80.

The fourth installation portion 32 includes a sleeve 321 and defines a second positioning hole 322. The sleeve 321 includes a recessed blocking portion 3211 and a second limiting block 3213. The sleeve 321 defines a sixth through hole 3212 in a substantially middle portion of the recessed blocking portion 3211. The second limiting bock 3213 corresponds to the second gap 2123. The second post 211 is received in the sixth through hole 3212 to fix the fourth installation portion 32 to the second torsion assembly 22. The second sector wheel 212 resists the blocking portion 3211, and the second limiting block 3213 is latched into the second gap 2123. When the second rotation shaft 21 is rotated relative to the sleeve 321, the second limiting block 3213 can move between the third stopping surface 2121 and the fourth stopping surface 2122 to limit a rotation angle of the second rotation shaft 21 relative to the sleeve 321. In this embodiment, the rotation shaft 21 can rotate 90 degrees relative to the sleeve 321. The second positioning hole 322 receives the second positioning pole 2212 of the third cam 221 to fix the third cam 221 relative to the sleeve 321.

The connection portion 33 is arc-shaped and fixed between the third installation portion 31 and the fourth installation portion 32. The connection portion 33 includes a stopper 331 to hold an electrical cable connected between the base 80 and the cover 90 in place.

In assembly, the second end portion 1112 of the first post 111 passes through the first through hole 1221, thereby rotatably connecting the positioning member 12 and the first torsion assembly 13 to the first post 111. The first end portion 1111 of the first rotation shaft 11 is connected and fixed to the connector 30. The second end portion 1112 is fixed to the first stopping member 14, to fix the positioning member 12 and the first torsion assembly 13 between the first end portion 1111 and the second end portion 1112. The first limiting block 1222 is latched into the first gap 1123 and resists the first stopping surface 1121. Then, the second rotation shaft 21 passes through the sixth through hole 3212 of the fourth installation portion 32. Further, the second rotation shaft 21 passes through the second torsion assembly 22. The second rotation shaft 21 fixes to the second stopping member 23 to make the second limiting block 3213 latch into the second gap 2123 and resist the third stopping surface 2121. At last, the first rotation assembly 10 is installed on the first installation portion 814 by the first positioning portion 121, and the second rotation assembly 20 is installed on the second installation portion 911 of the cover 90 by the second positioning portion 213. The first stopping member 14 is fixed to the second end portion 1112 of the first rotation shaft 11 to prevent the positioning member 12 and the torsion assembly 13 from detaching from the rotation shaft 11. The second stopping member 14 can be fixed to an end portion of the second post 211 away from the second sector wheel 212 to prevent the second torsion assembly 22 from detaching from the second post 211. In this embodiment, the first stopping member 14 and the second stopping member 23 can be nuts.

When the second cam 132 is driven by the first rotation shaft 11 to rotate relative to the first cam 131 along a first direction, the two first protrusions 1325 are gradually received into the corresponding two first stepped notches 1315. The two first protrusions 1325 make the first cam 131 partially latch with the second cam 132. The first recessed surface 1313 resist the first protrusion surface 1322. Accordingly, when the second cam 132 is rotated along a second direction opposite to the first direction relative to the first cam 131, the two first protrusions 1325 are gradually removed out from the two first stepped notches 1315. The two first protrusions 1325 make the first cam 131 and the second cam 132 detach from each other.

When the fourth cam 222 is driven by the second rotation shaft 21 to rotate relative to the third cam 221 along a third direction, the two second protrusions 2225 are gradually received into the two second stepped notches 2215. The two second protrusions 2225 make the third cam 221 partially latch with the fourth cam 222. The second recessed surface 2213 resist the second protrusion surface 2222. Accordingly, when the fourth cam 222 is rotated along a fourth direction opposite to the third direction relative to the third cam 221, the two second protrusions 2225 are gradually removed from the two second stepped notches 2215. The two second protrusions 2225 make the third cam 221 and the fourth cam 222 detach from each other.

Additionally, the first elastic assembly 133 is sleeved onto the second end portion 1112 of the first post 111 via the third through hole 1332. The second elastic assembly 223 is sleeved onto the second post 211 via the fifth through hole 2232. When the second cam 132 rotates relative to the first cam 131, the first elastic assembly 133 can be compressed to deform to adjust a friction between the first cam 131 and the second cam 132. When the fourth cam 222 rotates relative to the third cam 221, the second elastic assembly 223 can be compressed to deform to adjust a friction between the third cam 221 and the fourth cam 222.

Figure 11:
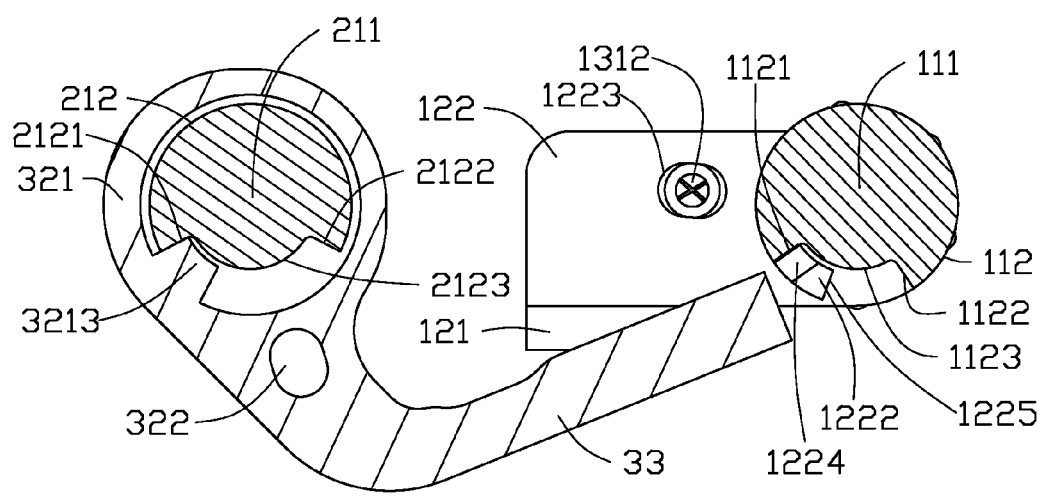
FIG. 11 is a cross-sectional view of FIG. 4 taken along line XI-XI, wherein the foldable electronic device is in the folded state.

Referring to FIG. 11, when the cover 11 covers the base 80 and the electronic device 100 is in a folded state, a side of the holding portion 122 where the first limiting block 1222 is located resists the first sector wheel 112, and the first limiting block 1222 is latched into the first gap 1123. The first limiting surface 1224 of the first limiting block 1222 resists the first stopping surface 1121 of the first sector wheel 112, and the second limiting block 3213 resists the third stopping surface 2121. The second protrusions 2225 are received into the second stepped notches 2215 to make the third cam 221 partially latch with the fourth cam 222.

Figure 12:
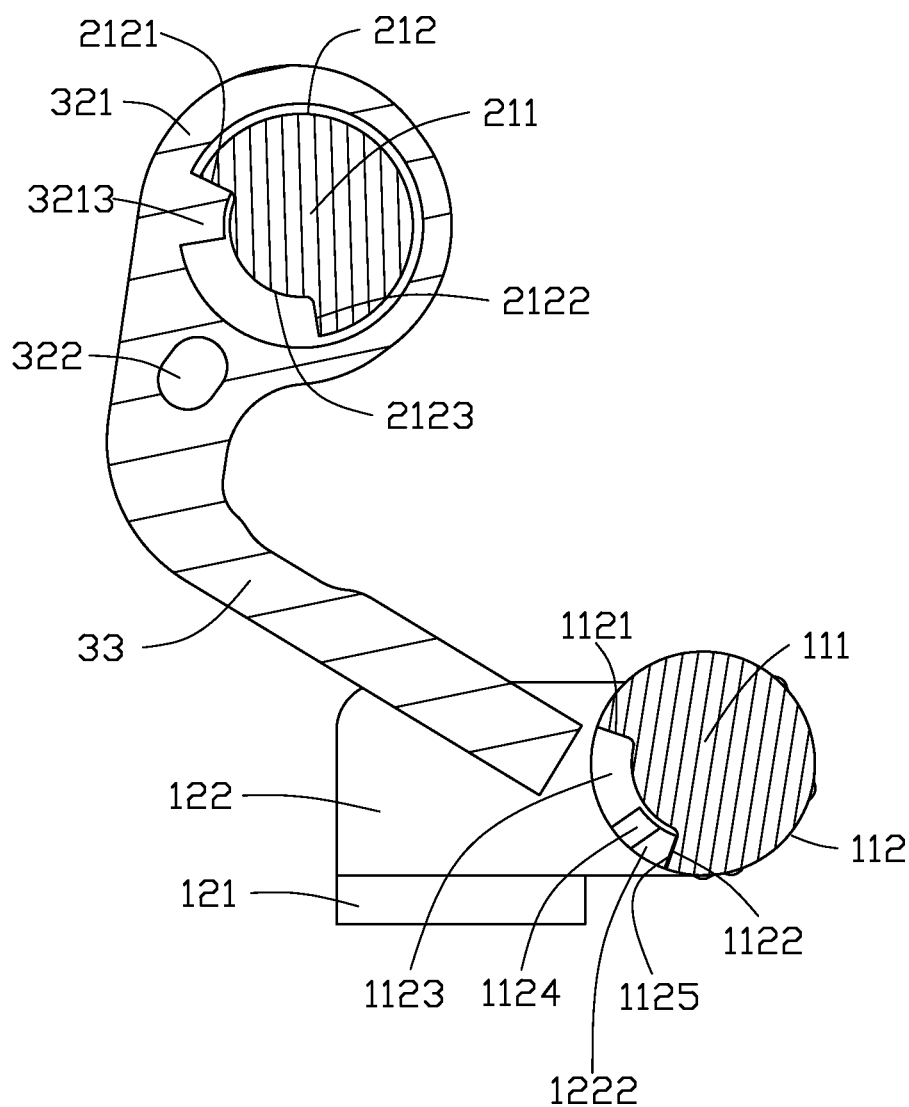
FIG. 12 is similar to FIG. 11, but showing when the cover is rotated to the first angle.

Referring to FIG. 12, when the cover rotates to the first angle relative to the base 80, the second stopping surface 1122 resists the second limiting surface 1225 of the first limiting block 1222, to prevent the first rotation shaft 11 from further rotating relative to the positioning member 12. At this time, the two first protrusions 1325 (not shown in FIG. 12) are completely received into the two first stepped notches 1315 (not shown in FIG. 12), to make the first cam 131 completely latch with the second cam 132.

When the cover 90 is rotated further relative to the base 80 from the first angle, the second stopping surface 1122 of the first sector wheel 112 prevents the first rotation shaft 11 from rotating further. At this time, the second rotation shaft 21 is driven to make the fourth cam 222 rotate relative to the connector 30 and the third cam 221. Then, the two protrusions 2225 are gradually removed from the two second stepped notches 2215 to make the third cam 221 and the fourth cam 222 detach from each other. The third stopping surface 2121 gradually moves away from the second limiting block 3213, and the fourth stopping surface 2122 gradually moves toward the second limiting block 3213.

Figure 13:
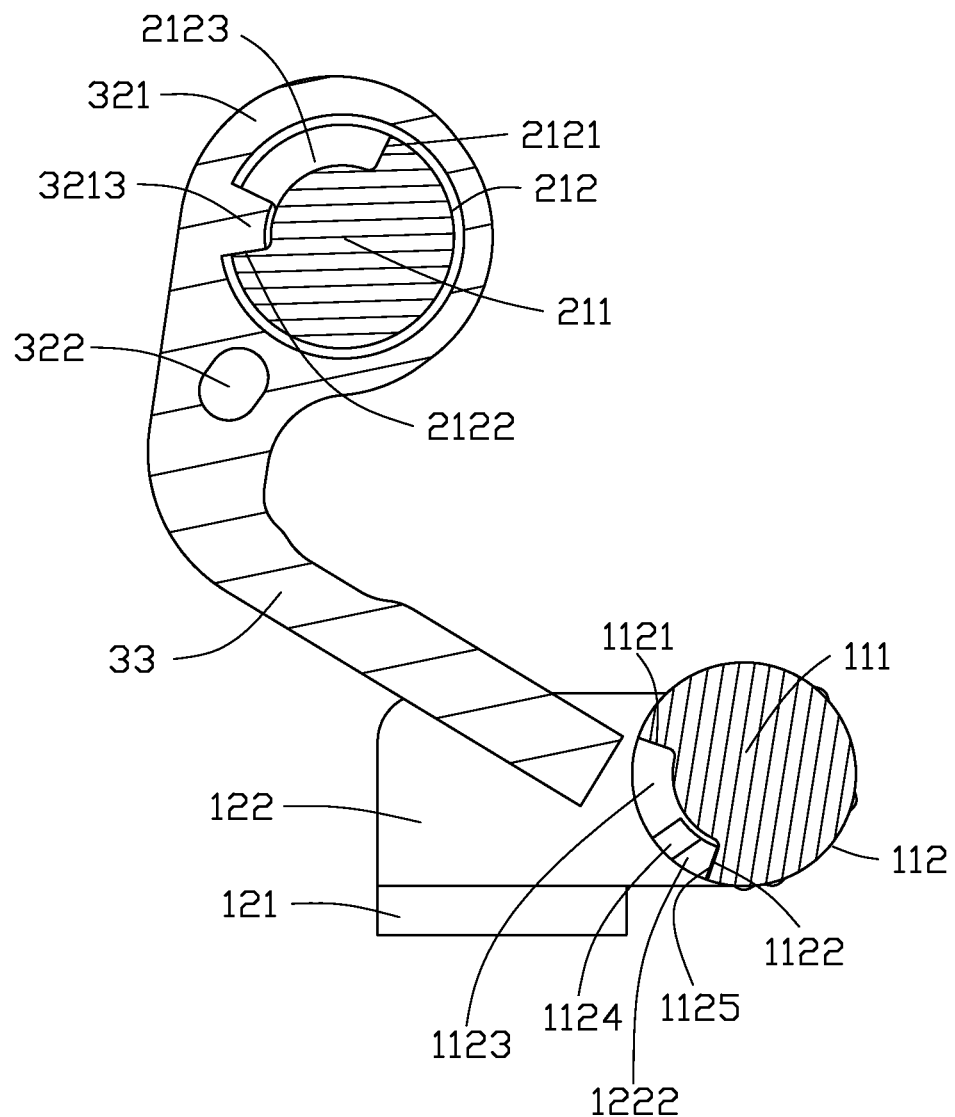
FIG. 13 is similar to FIG. 12, but showing when the cover is rotated to the second angle.

Referring to FIG. 13, when the cover 90 has been rotated from the first angle to the second angle relative to the base 80, the fourth stopping surface 2122 resists the second limiting block 3213 to prevent the second rotation shaft 21 from rotating further relative to the connector 30. At this time, the two second protrusions 2225 are completely removed from the two second stepped notches 2215 to make the third cam 221 detach from the fourth cam 222. In this embodiment, the first angle can be 45 degrees, and the second angle can be 135 degrees.

The operating principles to fold the electronic device 100 from the second angle to the folded state are substantially similar to the above-described principles of unfolding the electronic device 100 from the folded state to the second angle.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

What is claimed is:

1. A pivot mechanism configured to rotatably couple a base of an electronic device to a cover of the electronic device, the pivot mechanism comprising:
 a connector;
 a first rotation assembly rotatably coupled to the base and fixedly attached to the connector; and
 a second rotation assembly fixedly coupled to the cover and rotatably coupled to the connector;
 the first rotation assembly and the second rotation assembly cooperatively having a first configuration in which the angle between the base and the cover are at a minimum angle;
 the first rotation assembly being configured to rotate relative to the base and the second rotation assembly being configured to remain fixed relative to the connector as the angle between the cover and the base increases from the minimum angle to a first predetermined angle;
 the second rotation assembly being configured to rotate relative to the connector as the angle between the cover and base increases from the first predetermined angle to a second predetermined angle;
 wherein the first rotation assembly comprises a first rotation shaft, a first sector wheel installed on the first rotation shaft, and a positioning member sleeved on the first rotation shaft; the first rotation shaft has a first end portion fixed to the connector and a second end portion rotatably connected to the base; the first sector wheel comprises a first stopping surface and a second stopping surface; the positioning member is fixed to the base and comprises a first limiting block capable of moving between the first stopping surface and the second stopping surface; when the cover gradually rotates to the first predetermined angle, the first sector wheel rotates relative to the first limiting block to make the first limiting block resist the second stopping surface and to prevent the first rotation shaft from moving relative to the positioning member; and
 wherein the second rotation assembly comprises a second rotation shaft and a second sector wheel installed on the first rotation shaft; the second rotation shaft has one end rotatably connected to the connector and the other end fixed to the cover; the first sector wheel comprises a third stopping surface and a fourth stopping surface, the connector comprises a second limiting block capable of moving between the third stopping surface and the fourth stopping surface; when the cover rotates from the first predetermined angle to the second predetermined angle, the second sector wheel rotates relative to the second limiting block to make the second limiting block resist the fourth stopping surface and prevent the second rotation shaft from moving relative to the connector.

2. The pivot mechanism according to claim 1, wherein the first rotation assembly further comprises a first torsion assembly, the first torsion assembly comprises a first cam and a second cam coupled with the first cam, the first cam comprises a first recessed surface, the second cam comprises a first protrusion surface corresponding to the first recessed surface; the second rotation assembly further comprises a second torsion assembly, the second torsion assembly comprises a third cam and a fourth cam coupled with the third cam, the third cam comprises a second recessed surface, and the fourth cam comprises a second protrusion surface corresponding to the second recessed surface.

3. The pivot mechanism according to claim 2, wherein when the angle between the base and the cover are at the minimum angle, the first recessed surface detaches from the first protrusion surface while the second recessed surface resists the second protrusion surface.

4. The pivot mechanism according to claim 3, wherein the first torsion assembly is sleeved on the first rotation shaft to allow the second cam to rotate with the first rotation shaft relative to the first cam to adjust a space between the first recessed surface and the first protrusion surface.

5. The pivot mechanism according to claim 2, wherein when the angle between the cover and the base increases from the minimum angle to the first predetermined angle, the first recessed surface resists the first protrusion surface and the second recessed surface resists the second protrusion surface.

6. The pivot mechanism according to claim 2, wherein when the angle between the cover and the base increases from the first predetermined angle to the second predetermined angle, the first recessed surface resists the first protrusion surface while the second recessed surface detaches from the second protrusion surface.

7. The pivot mechanism according to claim 6, wherein; the second torsion assembly is sleeved on the second rotation shaft to allow the fourth cam to rotate with the second rotation shaft relative to the third cam to adjust a space between the second recessed surface and the second protrusion surface.

8. The pivot mechanism according to claim 2, wherein the first recessed surface defines two first stepped notches and the first protrusion surface defines two first protrusions corresponding to the two first stepped notches; when the second cam rotates relative to the first cam along a first direction, the two first protrusions are gradually received into the two first stepped notches to make the first recessed surface resist the first protrusion surface; when the second cam rotates relative to the first cam along a second direction opposite to the first direction, the two first protrusions are gradually removed out from the two first stepped notches to detach the first recessed surface and the first protrusion surface;

the second recessed surface defines two second stepped notches and the second protrusion surface defines two second protrusions corresponding to the two second stepped notches; when the fourth cam rotates relative to the third cam along a third direction, the two second protrusions are gradually received into the two second stepped notches to make the second recessed surface to resist the second protrusion surface; when the fourth cam rotates relative to the third cam along a fourth direction opposite to the third direction, the two second protrusions are gradually removed out from the two second stepped notches to detach the second recessed surface from the second protrusion surface.

9. A foldable electronic device, comprising:
a cover, a base, and a pivot mechanism configured to rotatably couple the base to the cover, the pivot mechanism comprising:
a connector;
a first rotation assembly rotatably coupled to the base and fixedly attached to the connector; and
a second rotation assembly fixedly coupled to the cover and rotatably coupled to the connector;
the first rotation assembly and the second rotation assembly cooperatively having a first configuration in which the angle between the base and the cover are at a minimum angle;
the first rotation assembly being configured to rotate relative to the base and the second rotation assembly being configured to remain fixed relative to the connector as the angle between the cover and the base increases from the minimum angle to a first predetermined angle;
the second rotation assembly being configured to rotate relative to the connector as the angle between the cover and base increases from the first predetermined angle to a second predetermined angle;
wherein the first rotation assembly comprises a first rotation shaft, a first sector wheel installed on the first rotation shaft, and a positioning member sleeved on the first rotation shaft; the first rotation shaft has a first end portion fixed to the connector and a second end portion rotatably connected to the base; the first sector wheel comprises a first stopping surface and a second stopping surface; the positioning member is fixed to the base and comprises a first limiting block capable of moving between the first stopping surface and the second stopping surface; when the cover gradually rotates to the first predetermined angle, the first sector wheel rotates relative to the first limiting block to make the first limiting block resist the second stopping surface and to prevent the first rotation shaft from moving relative to the positioning member; and
wherein the second rotation assembly comprises a second rotation shaft and a second sector wheel installed on the first rotation shaft the second rotation shaft has one end rotatably connected to the connector and the other end fixed to the cover; the first sector wheel comprises a third stopping surface and a fourth stopping surface, the connector comprises a second limiting block capable of moving between the third stopping surface and the fourth stopping surface; when the cover rotates from the first predetermined angle to the second predetermined angle, the second sector wheel rotates relative to the second limiting block to make the second limiting block resist the fourth stopping surface and prevent the second rotation shaft from moving relative to the connector.

10. The foldable electronic device according to claim 9, wherein the first rotation assembly further comprises a first torsion assembly, the first torsion assembly comprises a first cam and a second cam coupled with the first cam, the first cam comprises a first recessed surface, the second cam comprises a first protrusion surface corresponding to the first recessed surface; the second rotation assembly further comprises a second torsion assembly, the second torsion assembly comprises a third cam and a fourth cam coupled with the third cam, the third cam comprises a second recessed surface, and the fourth cam comprises a second protrusion surface corresponding to the second recessed surface.

11. The foldable electronic device according to claim 10, wherein when the angle between the base and the cover are at the minimum angle, the first recessed surface detaches from the first protrusion surface while the second recessed surface resists the second protrusion surface.

12. The foldable electronic device according to claim 11, wherein the first torsion assembly is sleeved on the first rotation shaft to allow the second cam to rotate with the first rotation shaft relative to the first cam to adjust a space between the first recessed surface and the first protrusion surface.

13. The foldable electronic device according to claim 10, wherein when the angle between the cover and the base increases from the minimum angle to the first predetermined angle, the first recessed surface resists the first protrusion surface and the second recessed surface resists the second protrusion surface.

14. The foldable electronic device according to claim 10, wherein when the angle between the cover and the base increases from the first predetermined angle to the second predetermined angle, the first recessed surface resists the first protrusion surface while the second recessed surface detaches from the second protrusion surface.

15. The foldable electronic device according to claim 14, wherein the second torsion assembly is sleeved on the second rotation shaft to allow the fourth cam to rotate with the second rotation shaft relative to the third cam to adjust a space between the second recessed surface and the second protrusion surface.

16. The foldable electronic device according to claim 10, wherein the first recessed surface defines two first stepped notches and the first protrusion surface defines two first protrusions corresponding to the two first stepped notches; when the second cam rotates relative to the first cam along a first direction, the two first protrusions are gradually received into the two first stepped notches to make the first recessed surface resist the first protrusion surface; when the second cam rotates relative to the first cam along a second direction opposite to the first direction, the two first protrusions are gradually removed out from the two first stepped notches to detach the first recessed surface and the first protrusion surface;

the second recessed surface defines two second stepped notches and the second protrusion surface defines two second protrusions corresponding to the two second stepped notches; when the fourth cam rotates relative to the third cam along a third direction, the two second protrusions are gradually received into the two second stepped notches to make the second recessed surface to resist the second protrusion surface; when the fourth cam rotates relative to the third cam along a fourth direction opposite to the third direction, the two second protrusions are gradually removed out from the two second stepped notches to detach the second recessed surface from the second protrusion surface.

* * * * *